United States Patent
Yariv et al.

(10) Patent No.: US 8,208,399 B2
(45) Date of Patent: Jun. 26, 2012

(54) RATING EFFORT INPUT DEVICE

(75) Inventors: Eran Yariv, Zichron (IL); Inbal Ort, Aseret (IL)

(73) Assignee: Microsoft Corporation, Redmond, WA (US)

( * ) Notice: Subject to any disclaimer, the term of this patent is extended or adjusted under 35 U.S.C. 154(b) by 319 days.

(21) Appl. No.: 12/706,698

(22) Filed: Feb. 16, 2010

(65) Prior Publication Data

US 2011/0201386 A1    Aug. 18, 2011

(51) Int. Cl.
*H04J 1/16* (2006.01)
*H04L 12/56* (2006.01)

(52) U.S. Cl. ......... 370/252; 370/329; 370/419; 370/463
(58) Field of Classification Search ................... 370/252, 370/329, 419, 463
See application file for complete search history.

(56) References Cited

U.S. PATENT DOCUMENTS

| | | | |
|---|---|---|---|
| 7,505,163 B2 | 3/2009 | Hart et al. | |
| 2002/0040311 A1 | 4/2002 | Douglass et al. | |
| 2004/0210491 A1 | 10/2004 | Sadri | |
| 2006/0059130 A1 | 3/2006 | Weiss et al. | |
| 2006/0253800 A1 | 11/2006 | Jones et al. | |
| 2008/0208819 A1 | 8/2008 | Wang et al. | |
| 2010/0287105 A1* | 11/2010 | Araki et al. | 705/300 |

OTHER PUBLICATIONS

Stanley, et al., "Watch What I Do!—Using Graphical Input Controls in Web Surveys", Retrieved at <<https://www.snapsurveys.com/pdf/visual-controls-paper.pdf>>, Sep. 2007, pp. 81-92.
"Survey Software and Services", Retrieved at <<http://www.snapsurveys.com/pdf/snap-surveys-brochure-us.pdf>>, Feb. 1, 2010, pp. 15.
Edwards, Lin, "WOWD, the real-time search engine", Retrieved at <<http://www.physorg.com/news175766546.html>>, Oct. 26, 2009, pp. 9.
"A Survey of Survey Tools", Retrieved at <<http://wac.osu.edu/workshops/survey_of_surveys/>>, Feb. 1, 2010, pp. 9.

* cited by examiner

*Primary Examiner* — John Pezzlo
(74) *Attorney, Agent, or Firm* — Russell S. Krajec; Krajec Patent Offices, LLC

(57) ABSTRACT

A rating mechanism may calculate a rating based on a user's effort and duration of input to an input mechanism. The more effort and time a user exerts, the more extreme the rating. In one embodiment, a mobile telephone may have a wheel, slider, or other mechanism that may change a rating based on how fast and how long a user may activate the input mechanism. In another embodiment, the rating may be based on how furiously an accelerometer within a device is activated, such as by shaking the device repeatedly.

20 Claims, 5 Drawing Sheets

400
METHOD FOR CAPTURING
USER RATING

RATING EFFORT INPUT DEVICE

BACKGROUND

Rating systems are often used to gather user's feedback about any number of items, from rating pictures on social networks to rating food quality at a restaurant, rating books by a bookseller, or rating a seller in an online auction. Ratings from many different users may be displayed so that other users can judge the value or appropriateness of the item.

SUMMARY

A rating mechanism may calculate a rating based on a user's effort and duration of input to an input mechanism. The more effort and time a user exerts, the more extreme the rating. In one embodiment, a mobile telephone may have a wheel, slider, or other mechanism that may change a rating based on how fast and how long a user may activate the input mechanism. In another embodiment, the rating may be based on how furiously an accelerometer within a device is activated, such as by shaking the device repeatedly.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
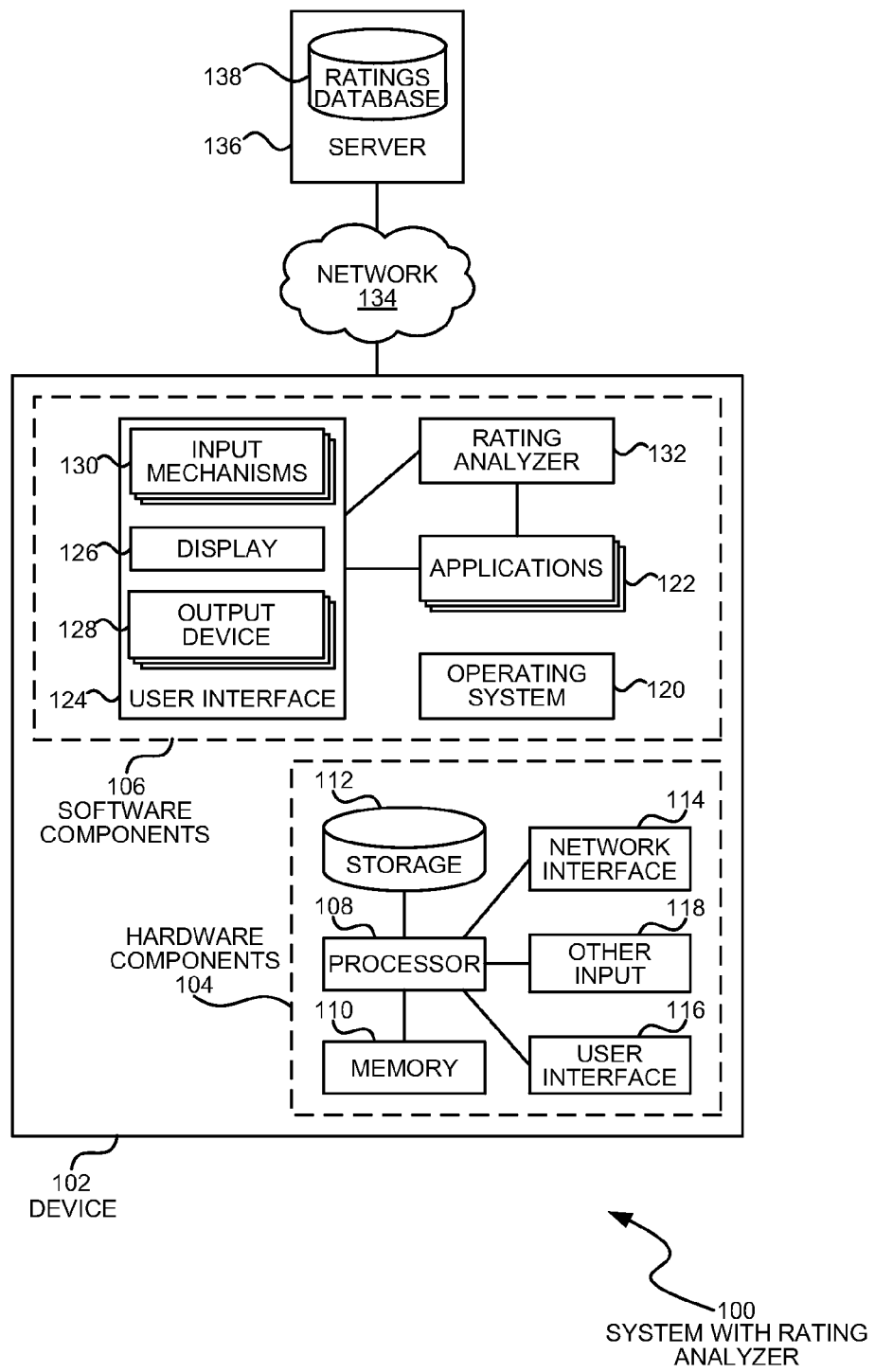
FIG. 1 is a diagram illustration of an embodiment showing an system with a rating analyzer.

A rating mechanism may determine a rating for an item based on a user's effort and duration of input to an input mechanism. The more extreme the effort, the more extreme the rating. In order to give an item an extreme rating, the user may have to expend a relatively large amount of effort, compared to a low or moderate rating where less effort may be expended.

The resulting ratings may be considered to have more value than rating mechanism where a user may exert the same amount of effort to input a poor rating as good rating. This is because ratings at extreme ends of the rating spectrum can be achieved only when users invest a relatively large amount of time and effort to enter the rating. Thus, an item's rating may be more believable and trustworthy using the rating mechanism than with other systems.

The input mechanism used to capture the rating may be any input mechanism for which a user's effort and duration may be measured. For example, an input mechanism may be a wheel or knob on a touchscreen interface that a user may rotate quickly and repeatedly with their finger to generate a higher rating score. In another example, an input mechanism may be an accelerometer in a handheld device that may sense the intensity and duration of a user's shaking action that may be used to generate a rating score.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be for example, but not limited to, an electronic, magnetic, optical, electromagnetic, infrared, or semiconductor system, apparatus, device, or propagation medium. By way of example, and not limitation, computer-readable media may comprise computer storage media and communication media.

Computer storage media includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and may be accessed by an instruction execution system. Note that the computer-usable or computer-readable medium can be paper or other suitable medium upon which the program is printed, as the program can be electronically captured via, for instance, optical scanning of the paper or other suitable medium, then compiled, interpreted, of otherwise processed in a suitable manner, if necessary, and then stored in a computer memory.

Communication media typically embodies computer-readable instructions, data structures, program modules or other data in a modulated data signal such as a carrier wave or other transport mechanism and includes any information delivery media. The term "modulated data signal" can be defined as a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above-mentioned should also be included within the scope of computer-readable media.

When the subject matter is embodied in the general context of computer-executable instructions, the embodiment may comprise program modules, executed by one or more systems, computers, or other devices. Generally, program modules include routines, programs, objects, components, data structures, and the like, that perform particular tasks or implement particular abstract data types. Typically, the functionality of the program modules may be combined or distributed as desired in various embodiments.

FIG. 1 is a diagram of an embodiment 100, showing a device with a rating analyzer. Embodiment 100 is a simplified example of a device that may have a user input mechanism that may be used to determine a rating for an item.

The diagram of FIG. 1 illustrates functional components of a system. In some cases, the component may be a hardware component, a software component, or a combination of hardware and software. Some of the components may be application level software, while other components may be operating system level components. In some cases, the connection of one component to another may be a close connection where two or more components are operating on a single hardware platform. In other cases, the connections may be made over network connections spanning long distances. Each embodiment may use different hardware, software, and interconnection architectures to achieve the described functions.

Embodiment 100 is an example of a device that may be used to create ratings for various items. The rating may be determined by a user's actions with a user interface, and those actions that consume larger amounts of effort and time may result in greater ratings.

The user may interact with a user input mechanism in a deliberate manner to achieve ratings at far ends of a rating scale. The deliberate manner may cause the ratings to be more valued than other ratings systems where any rating level can be achieved with the same user effort.

The user input mechanism may be a wheel, for example, that the user may spin rapidly and for a lengthy period of time in order to reach a very high or very low rating. In another example, a user may follow a maze or perform some operation that consumes focus, effort, and time in order to achieve a rating. In still another example, a rating may be determined by how furiously a user shakes a device, such as a cellular telephone, that contains an accelerometer input mechanism.

The rating system may operate with various applications which may gather user input about various items. For example, a restaurant guide may allow users to input ratings for specific restaurants, or an online marketplace may solicit feedback from customers who have purchased certain items. In another example, a movie website may have a forum for receiving movie reviews which may include user preferences for the various movies.

The rating system may be useful in a cellular telephone or other portable device. The rating system may allow applications that are location aware to identify items near the user and solicit input about those items. For example, an application may determine through a Global Positioning System (GPS) receiver that a user is located at a coffee shop. The user may be prompted to give feedback for the coffee shop in the form of a rating.

The rating system may also be useful in a desktop computer system or other non-mobile embodiments. In such embodiments, the rating system may be used in conjunction with a web browser or other application to gather user input for many different types of applications.

The rating system may present a starting rating value and the user may perform some activity to indicate the user's like or dislike of the item. As the user engages the input mechanism with either or both of effort or time, the rating value may change. The longer or more intense the action, the more extreme the rating.

In some embodiments, the starting rating value may be a middle or average rating, and the user may adjust the rating up or down by engaging an input mechanism. In some such embodiments, the average rating may be the current rating stored in a rating database for the item. In other embodiments, the average rating may be the midpoint of a rating scale.

Some embodiments may use one end of a rating scale as a starting rating value. For example, a movie rating scale may rate movies using a series of zero to five stars. In such an example, the starting rating value may be zero stars and the user may increase the number of stars by repeated input or by performing a task that takes both time and effort.

The device 102 may be any type of computing device. In some embodiments, the device 102 may be a personal computer, such as a desktop or laptop computer. In some cases, the device 102 may be a server computer, game console, network appliance, or other device.

The device 102 may be a handheld device, such as a mobile telephone or personal digital assistant. In some embodiments, the handheld device may be a Global Positioning System (GPS) tracking device, such as a device that provides turn by turn directions or shows a moving map with a continually updated location.

The device 102 may be made up of hardware components 104 and software components 106. The example of embodiment 100 is merely one embodiment of a device that may incorporate a rating system. Other embodiments may have different hardware or software configuration and may implement the various features and components in different manners.

The hardware components 104 may include a processor 108 that may use random access memory 110 and nonvolatile storage 112. The hardware components 104 may also include a user interface 114 and a network interface 116, as well as other input components 118.

The software components 106 may include an operating system 120 on which various applications 122 may execute. The applications 122 may create a user interface 124 that has items for display 126 and other output devices 128. The user interface 124 may use various input mechanisms 130 that capture user input.

The items in the user interface 124 may be software items by which information may be transmitted to a user or captured from a user. An example of a display 126 may be the various graphical user interface components that an application 122 or operating system 120 may generate for display on an output device. An example of other output devices 128 may be audio output on a loudspeaker, tactile output through a vibrating device, or other output mechanisms.

The input mechanisms 130 may be graphical user interface objects that can be manipulated by a user. A pointing device may be used to move, click, or otherwise engage or manipulate objects on a graphical display. The pointing device may be a user's finger in the case of a touchscreen display, or may be a mouse, stylus, trackball, or other pointing device.

A rating analyzer 132 may gather user input to determine ratings for various items. The rating analyzer 132 may gather user effort and duration when a user inputs a rating, and may use the effort and duration to determine a rating for an item. The rating analyzer 132 may use various formulas, heuristics, or other definitions to determine a rating based on the user input.

In many embodiments, the device 102 may be connected to a network 134. The network 134 may be a local area network, a wide area network such as the Internet, a radio network such as a mobile telephone network, or other network.

A server 136 may have a ratings database 138 that may contain ratings submitted by multiple users. An example of the server 136 may be a web server that may host an online shopping forum that collects user input about various products for sale on the forum. The ratings database 138 may include the input from multiple users.

Figure 2:
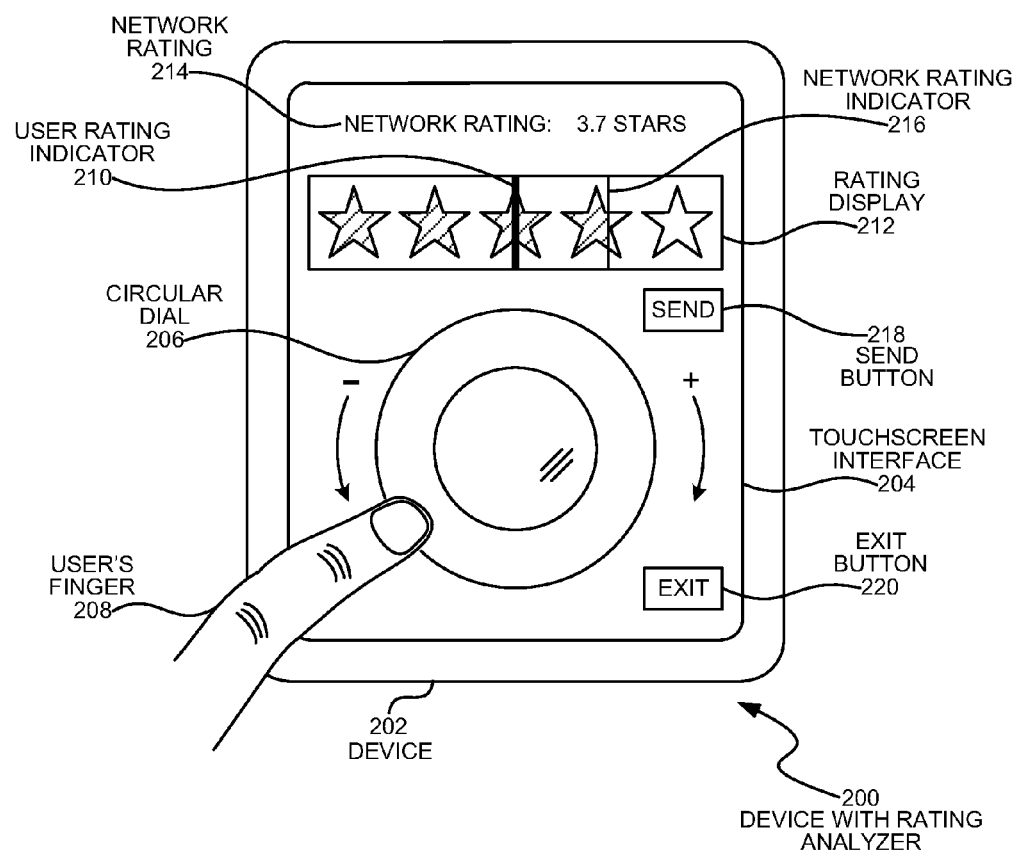
FIG. 2 is a diagram illustration of an example embodiment showing a device with a rating input mechanism.

FIG. 2 is a diagram illustration of an embodiment 200 showing a device with a ratings analyzer. Embodiment 200 is a simplified example of a user input mechanism by which a user may enter a rating.

Embodiment 200 is merely one example of an input mechanism by which a user's effort and duration can be used to create a rating. In order to input a rating at an extreme end of a rating spectrum, the user may exert a considerable amount of effort and/or time.

The device 202 may be any device that has a touchscreen interface 204. A typical embodiment may be a cellular telephone with a touchscreen input, as well as other devices that have a touchscreen input.

A circular dial 206 may be operated by a user's finger 208 to increase or decrease a rating. The circular dial 206 may be a user interface object that is presented on the touchscreen interface 204 and made active to receive a user's touch input. In order to operate the circular dial 206, the user may press against the touchscreen interface 204 along the dial, and then move around the circular path defined for the dial. The circular dial 206 may have graphical indicators that show that the movements of the circular dial 206 track the movements of the user's finger 208.

In order to provide input to the device 202, the user may drag their finger 208 around the circle of the circular dial 206 multiple times while keeping their finger pressed to the touchscreen interface 204. When the user rotates their finger along the circular dial 206 in a clockwise rotation, the rating may increase, and when the user rotates their finger along the circular dial 206 in a counter clockwise rotation, the rating may decrease. When the user has finished inputting the rating, the user may press the send button 218 to lock in their rating and cause their rating to be saved to a database. The user may exit the rating function without storing the rating by pressing the exit button 220.

A rating display 212 may have a user rating indicator 210. The user rating indicator 210 may move left or right as the user rotates the circular dial 206. The user rating indicator 210 is illustrated at the middle position in the rating scale.

The example of embodiment 200 illustrates a rating scale showing five stars. A rating of five starts may be the highest rating, while the rating of zero stars may be the lowest rating. A rating of two and a half stars may be the midpoint of the rating scale.

In the example of embodiment 200, the rating scale may start at the midpoint of the rating scale. For a user to provide a higher rating, the user may have to rotate the circular dial 206 clockwise. The speed and duration of the user's rotation may reflect the intensity of the rating so that a user may rotate the circular dial 206 many times in order to achieve the highest or lowest ratings.

The speed and duration of the user's actions may reflect the user's intensity of their rankings. The user may rotate the circular dial 206 for several seconds in order to achieve a four star rating and for a minute or more for a five star rating, for example.

Each embodiment may have different thresholds for determining the different rating levels. In some cases, a rating analyzer may monitor a user's actions to determine an effort factor and a duration factor. The effort factor may be based on the velocity or speed of the user's actions. In the case of embodiment 200, the effort factor may be based on the rotational speed of the circular dial 206 when the user is rotating the dial.

The duration factor may be based on the time a user has engaged the circular dial 206. In some cases, the duration factor may be based on the user's continuous contact or engagement with the input device, and in other cases, the duration may be a sum of two or more interactions with an input device.

Some embodiments may multiply the effort and duration factors to determine an 'energy' factor. The energy factor may be determined by multiplying the effort and duration factors so that a very fast engagement for a short period of time may be equivalent to a slower engagement for a longer period of time.

In some cases, a rating analyzer may have certain thresholds for determining a rating level that are based on effort, duration, and energy. For example, a rating analyzer may allow a rating of four stars when the user engages the circular dial 206 for ten seconds and a minimum of two positive rotations, regardless of the speed of the rotations. The same ratings analyzer may permit a further rating of four and a half stars when the energy expended is at least a half of a rotation per second, and a rating of five stars with that energy expended is maintained for thirty seconds. Such an example may use all three factors of effort, duration, and energy to define different ratings levels.

Some embodiments may use an exponential relationship between user input and ratings levels. An exponential relationship may be one of many non-linear relationships that may be used in different rating systems. In such an embodiment, a relatively small amount of effort may cause the rating to move the first increment or two in the rating scale. As the user goes past the initial increments of the rating scale, the effort expended to reach more extreme ratings may be higher on an exponential basis.

For example, a rating analyzer for the device 202 may use an energy factor of revolutions per second for the circular dial 206 to determine a rating. A linear scale may grant a half star rating for each 0.5 revolutions per second, so that a one star rating will be 1.0 revolutions per second, a 1.5 star rating will be 1.5 revolutions per second, and so on. In an exponential or nonlinear scale, the first half star rating may be granted at 0.25 revolutions per second, a full star at 0.5 revolutions per second, 1.5 star rating at 2.5 revolutions per second, a 2.0 star rating at 5 revolutions per second, and so on.

The example of embodiment 200 illustrates a baseline rating that is the midpoint of the rating scale. For the user to select a rating of two and a half stars, the user may merely click the send button 218 to lock in the current rating. In order to send a rating that is higher or lower than the midpoint, the user may activate the circular dial 206 to cause the user rating indicator 210 to increase or decrease the rating, then press the send button 218 to lock in the rating.

In some embodiments, the baseline rating may not be the midpoint of the rating scale. In the embodiment 200, a network rating 214 may be displayed in the text "Network Rating: 3.7 Stars" as well as a network rating indicator 216. The network rating indicator 216 may be represented by the shading of the stars, with approximately 3.7 of the stars being shaded.

In one example, the baseline rating may be the current network rating. In such an embodiment, the device 202 may perform a query to a remote server to gather the network rating and then may set the baseline rating to be the same as the network rating. In the example of embodiment 200, the baseline rating may be set to 3.7 stars and the user's actions with the circular dial 206 may result in a rating movement up or down from the network rating of 3.7.

In embodiments where the rating is performed from a baseline, a rating system may apply different sets of rules or formulas for determining ratings that are higher or lower than the baseline. In some embodiments, the ratings rules or formulas may define less effort for a user to produce lower ratings than higher ratings. In the example, the same effort in the positive direction may produce a smaller change than the same effort applied in the negative direction. Such an embodiment may be useful when the baseline rating is significantly different than the midpoint of a rating scale and may be skewed to one end of the rating scale.

Figure 3:
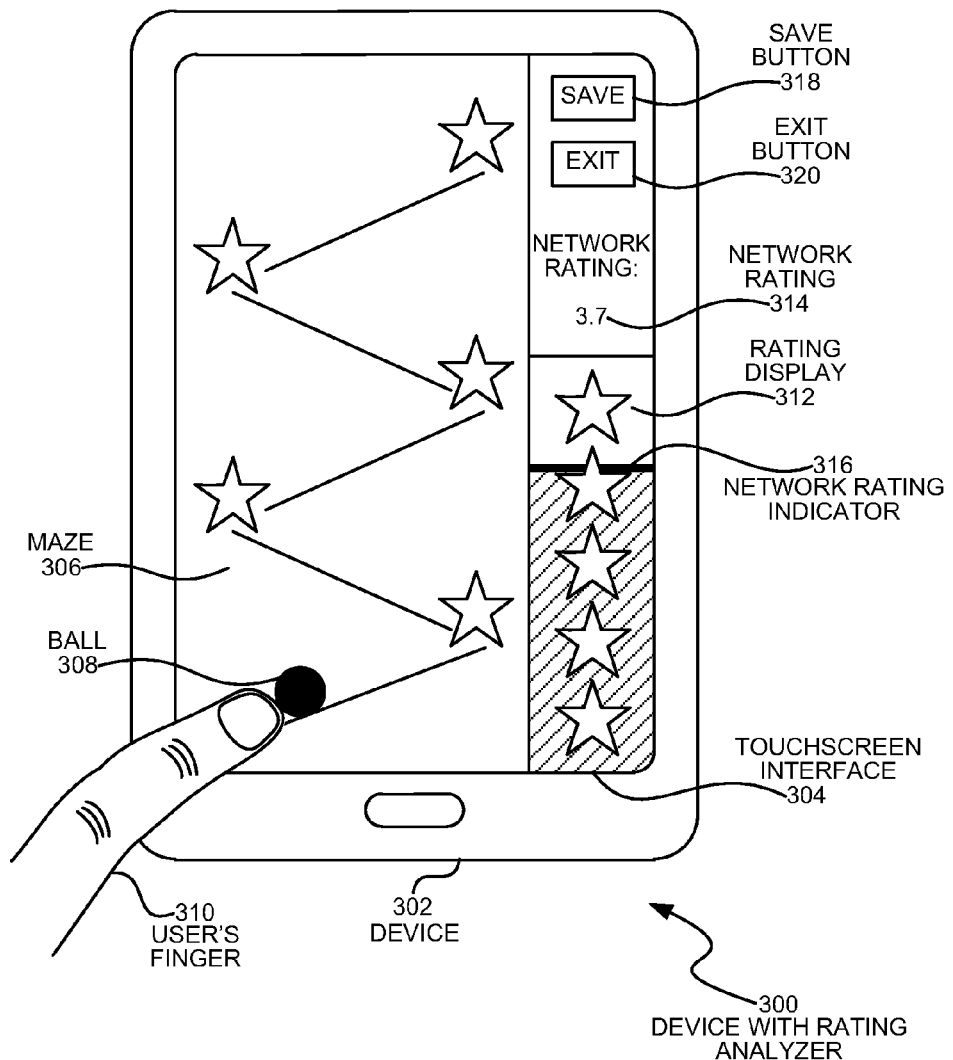
FIG. 3 is a diagram illustration of another example embodiment showing a device with a rating input mechanism.

FIG. 3 is a diagram illustration of an embodiment 300 showing a device with a second type of rating input system. Embodiment 300 illustrates a 'game' or challenge-type of rating input mechanism, where the more effort, concentration, and time are invested by the user, the higher the ratings.

Embodiment 300 illustrates a very simplified example of a game-type input device that may use skill and dexterity to achieve higher ratings. In the game, a user may 'push' a ball up a series of inclined planes to achieve various ratings. When the user releases their finger from 'pushing' the ball, the ball may begin to 'fall' to the bottom of the maze. The user may press the 'send' button quickly to lock in a high rating, otherwise the ball may continue to fall back down to the bottom and the user may start again. The user may wait for the ball to fall back down to a lower rating before pressing 'send' and locking in the rating.

Embodiment 200 illustrates a rating input device that may use input speed as a measure for 'effort'. The example of embodiment 200 may illustrate an example where 'effort' is readily calculated and an 'energy' computation may also be readily performed.

Embodiment 300 may be used to generate a similar 'effort' and 'duration' factors, but the factors may be derived by the gameplay as well as the overall interaction with the input mechanism. For example, an 'effort' factor may be derived by the success a user may have in playing the game, as well as the number of tries the user has exerted in order to achieve a score. The 'duration' factor may be determined by the length of time the user has expended playing the game to determine a rating.

The 'energy' factor may be determined by the score or success that the user experienced multiplied by the time the user invested. For example, a user who wins the game may achieve a five star rating, while another user who scores one star five times may also be given a five star rating.

The device 302 may have a touchscreen interface 304. In a typical embodiment, the device 302 may be a cellular telephone, for example, or other hand held personal electronic device.

The maze 306 as illustrated has several sloped ramps and a ball 308. The user's finger 310 may 'push' the ball up the sloped ramps, successively reaching up to five stars. The maze 306 is merely one example of a game by which a user's actions may be interpreted into ratings for a particular item. Other embodiments may have a combination of skill, dexterity, or other factors that may engage the user for a period of time to determine their ratings for an item.

In some cases, the gameplay may become addicting or otherwise desirable for a user. The pleasurable nature of a game of skill or dexterity may cause a user to enjoy the challenge of the game as opposed to being excited or motivated merely by the desire to input an extreme rating.

In such embodiments, an addictive or pleasurable gameplay may entice a user to enter a rating when the user may otherwise not be interested in supplying a rating. In such cases, the gameplay may be considered a reward or bonus for entering a rating, and may be a tool for encouraging ratings to be entered.

The gameplay may allow the user to lower a rating prior to saving the rating. In the example of the maze 306, the user may 'push' the ball 308 up the various inclined ramps and add stars to their rating. If the user is successful at reaching the top of the maze, a score of five stars may be awarded. However, if the user were to release the ball, the ball may begin to fall downward and remove stars from the rating. In such an embodiment, the user may actually achieve the rating of five stars with the gameplay, then may allow the rating to decrease to four, three, two, one, or no stars before pressing the save button 318 and locking in their score.

A rating display 312 may show a network rating 314 as a network rating indicator 316. The rating display 312 may show the user's current rating in real time as the user operates the maze 306.

When the user has achieved the desired rating, the user may press the save button 318 to lock in the rating. The save button 318 may also cause the user's rating to be uploaded to a network ratings database in some embodiments. The exit button 320 may allow the user to exit the rating process without saving a rating.

Embodiment 300 is an example of a rating system where the baseline rating score may be zero and the user's effort and duration may increase the rating. Embodiment 200, by contrast, may use a baseline rating of a midpoint within the rating scale.

Figure 4:
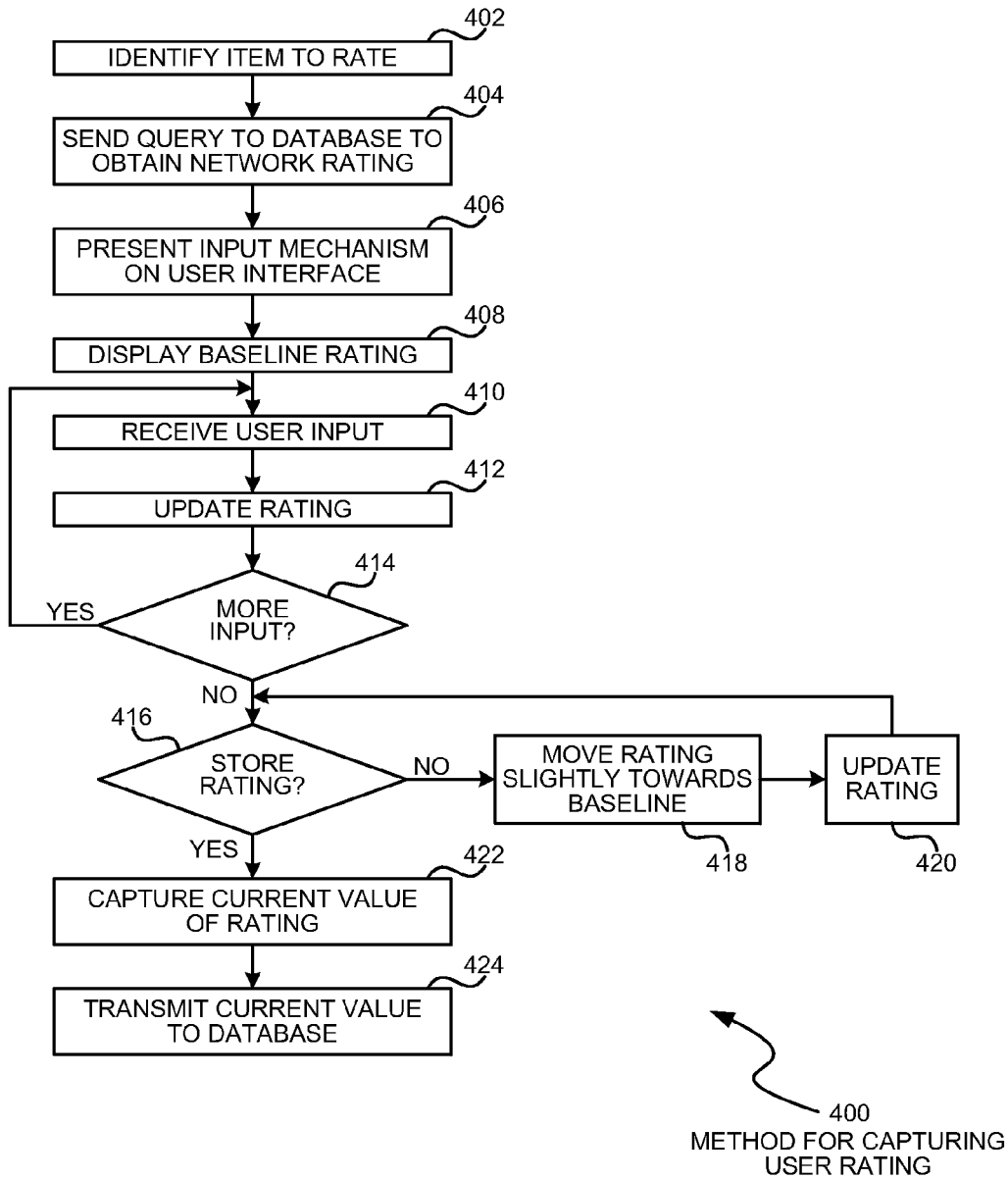
FIG. 4 is a flowchart illustration of an embodiment showing a method for capturing and processing user ratings.

FIG. 4 is a flowchart illustration of an embodiment 400 showing a method for capturing user ratings. Embodiment 400 is a simplified example of a method that may be performed by a rating analyzer, such as the rating analyzer 132 of embodiment 100.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 400 is one example of a method that may be performed to gather a rating based on user actions with a user interface. Embodiment 500 presented later in this specification illustrates a method that may be performed for the calculation of a rating.

In block 402, an item may be identified to rate. The item may be any item whatsoever, from the service at a delicatessen to a painting at a museum, to a user's feelings about a political topic.

In many cases, the item may be identified by another application, which may be a web application, application operable on a local device, or any other source. The item may be presented to the user on a user interface. In some cases, the item may be represented by a picture, text description, or other manner on a user interface, and may also be represented in the user interface while the user rating is being collected.

A query may be made in block 404 to a network database to obtain a network rating for the item. In some embodiments, the network database query may not be performed. For example, a designer may not wish to present the user with a preconceived notion of the current rating and may wish to receive the user's opinion without influence. Other embodiments, such as embodiments 200 and 300, may present the network rating prior to collecting the user's rating. Still other embodiments may present the network rating after collecting the user's rating.

In block 406, an input mechanism may be presented on a user interface for collecting the user rating. The user interface may be any mechanism by which a user's effort and duration may be captured. Examples of such user interface mechanisms are illustrated in embodiment 200 and 300, and many other user interface mechanisms may be used.

In some embodiments, the user interface mechanisms may include game-style interfaces, such as embodiment 300, where the user may be challenged to perform a task of dexterity or skill and consume and measure a user's effort, duration, and focus.

Other embodiments may have a dial, slider, button, or other input mechanism that the user may engage in a repetitive manner Embodiment 200 is one example of such an input mechanism.

Some embodiments may use other input mechanisms. For example, some mobile telephones and other portable devices may be outfitted with internal accelerometers. In such cases, the input mechanism may be the accelerometer, where the user may physically shake the device to enter a rating. In such a case, the user's effort may be derived from the intensity of the movement as represented by the acceleration experienced by the device, and the user's duration may be derived from the length of time the user shook the device.

In another embodiment, the input mechanism may be a microphone. In such cases, the user may shout or speak into the microphone to enter a rating. An effort value may be determined by the loudness of the input. A duration value may be determined by the length of the input.

Some embodiments may be physical buttons or other mechanical input mechanisms. For example, many mobile telephone devices, portable computers, and desktop computers may have keys used for volume control or other purposes. Such keys may be used to input a rating based on a frequency of actuating the button or the duration of holding the button depressed, for example. In some cases, the user may press one or more buttons in response to prompts on a display device as part of a gameplay input device.

In some embodiments, the baseline rating may be displayed in block 406.

In block 410, user input may be received and the rating may be updated in block 412. If there is more input in block 414, the process may loop back to block 410. An example of the input and processing of the input is illustrated in embodiment 500.

When the input has finished in block 414, the user may allow the rating to be reduced before storing the rating. The longer the user waits before storing the rating, the lower the rating may be. The rating reduction may slowly return the rating to the baseline rating while the user waits. In some embodiments, an animated visual effect may be presented on a display while the rating is reduced.

If the user does not store the rating in block 416, the rating may be moved towards the baseline rating level in block 418. The rating may be updated in block 420 and loop back to block 416. The process of blocks 418 and 420 may be repeated multiple times as the user waits for the rating to return to a value closer to the baseline rating.

The user may store the rating in block 416 by pressing a 'store' or 'send' button or otherwise causing the rating to be locked. The current value of the rating may be captured in block 422 and transmitted to a database in block 424 for further processing.

Figure 5:
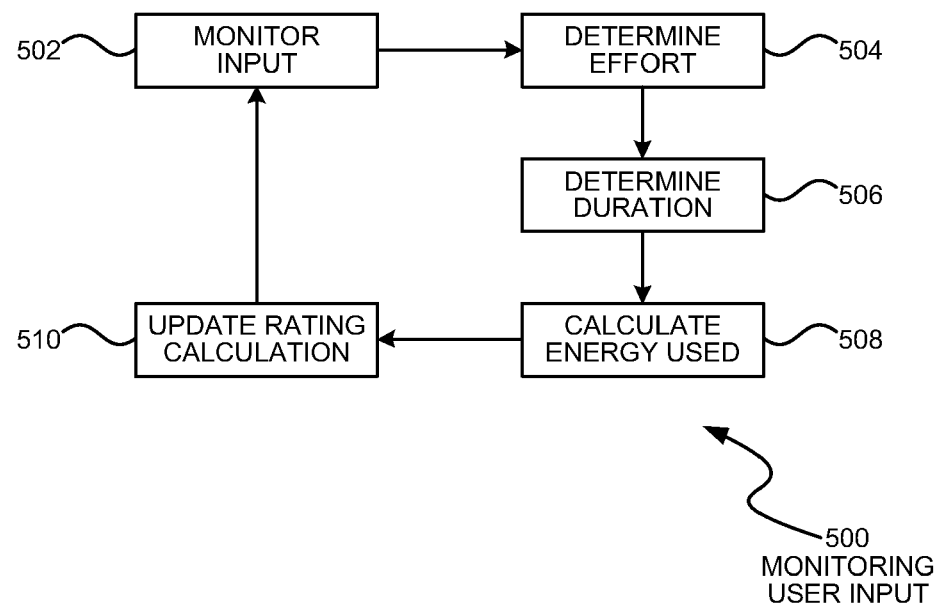
FIG. 5 is a flowchart illustration of an embodiment showing a method for monitoring user input.

FIG. 5 is a flowchart illustration of an embodiment 500 showing a method for monitoring user input during a rating capture operation. Embodiment 500 is a simplified example of a method that may be performed while a user is inputting a rating, such as during blocks 410-412 of embodiment 400.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 500 is a loop that may be performed while a user is inputting a rating. The user may be, for example, rotating a circular dial as in embodiment 200, playing a game as in embodiment 300, shaking a device when an accelerometer is used as an input device, or performing other action.

The user input may be received in block 502. From the user input, an effort factor may be determined in block 504 and a duration factor may be determined in block 506. From the effort and duration factors, the energy used may be determined in block 508. The rating may be re-calculated in block 510 and the process may return to block 502. The process of embodiment 500 may continue until the user exits through a step such as block 414 of embodiment 400. Such an exit is not illustrated in embodiment 500.

A rating may be determined in many different manners using a formula, heuristic, sets of rules, or other manners. In some embodiments, the rating may be determined through a complex definition that may include formulas, heuristics, or other definitions.

An effort factor from block 504 may be derived directly from a user action, such as from measuring the speed or frequency of a user input. In some embodiments, the effort factor may be determined from the level of difficulty of a game, or from some other source.

A duration factor from block 506 may be determined by the time a user may expend creating the rating. The duration factor may be determined by the time of a continuous engagement, such as the time a user continually presses a button on a key input mechanism. In some embodiments, the duration factor may be determined by the overall amount of time the user spent interacting with a device to create the rating. In such an embodiment, the overall time the user spent playing a game may be one example.

The 'energy' determined in block 508 may be determined by multiplying the effort factor with the duration factor. Some embodiments may not use an 'energy' factor in the calculation of ratings. When energy factor is used, a high energy level may be determined from either or both of a high effort value or a high duration. In the example of an accelerometer input, a very violent shaking for a short period of time may equate to a less violent movement for a longer period of time.

In some embodiments, two or more input mechanisms may be used to create a rating value. For example, an input mechanism may be an accelerometer where the rating change is based on how long and how furiously the user may shake the device. In such an example with a cellular telephone, the user may simultaneously press a button during the shaking event. For example, the user may press and hold the volume up button to increase the rating when shaking the device or may press and hold the volume down button to decrease the rating when shaking the device. Such an example may use two different input mechanisms to gather rating data.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. A method performed on a computer processor, said method comprising:
   identifying an item to rate;
   presenting an input mechanism on a user interface;
   receiving input from said input mechanism;
   measuring an effort value from said input mechanism;
   measuring a duration value from said input mechanism; and
   calculating a rating for said item, said rating comprising a rating change from a baseline rating, said rating change being determined from said effort value and said duration value.

2. The method of claim 1, said input mechanism having a directional input for increasing and decreasing said rating using said input.

3. The method of claim 1, said rating being based on a linear scale, said rating change being determined based on a nonlinear relationship of said effort.

4. The method of claim 3, said rating being calculated at least in part by multiplying said effort value with said duration value.

5. The method of claim 1 further comprising:
   presenting said rating while performing said receiving input.

6. The method of claim 1 further comprising:
   performing a query for said item and receiving a response comprising said baseline rating.

7. The method of claim 6, said baseline rating being a network rating for said item.

8. A system comprising:
   a user interface having a display and a first input mechanism;
   a processor;
   an application executed by said processor, said application having a first item to rate;
   a rating analyzer that:
      determines an effort value from a user input to said first input mechanism;
      determines an duration value from said user input to said first input mechanism;
      calculates a rating for said item from said effort value and said duration value; and
      returns said rating to said application for said first item.

9. The system of claim 8, said system being comprised in a hand held device.

10. The system of claim 9, said hand held device being a mobile telephone.

11. The system of claim 10, said first input mechanism being a touchscreen interface.

12. The system of claim 11, said touchscreen interface being configured with an object to be manipulated by a user.

13. The system of claim 12, said object being continuously manipulated by said user, said effort value being determined at least in part from a velocity measurement from said object.

14. The system of claim 8, said first input device being an accelerometer.

15. The system of claim 14, said effort value being determined at least in part from an output of said accelerometer.

16. The system of claim 8, said first input mechanism and said display being configured to present an object to be manipulated, said duration value being determined at least in part by a length of time that a user continually engages said object.

17. The system of claim 8 further comprising a second input mechanism, said rating analyzer that further:
   calculates said rating for said item from input received from said second input mechanism.

18. A device comprising:
   a processor;
   a network connection;
   a connection to a database comprising a current rating value for an item;
   a user interface comprising a display and an input mechanism;
   an application executed by said processor, said application having a first item to rate;
   a rating application operable on said processor, said rating application that:
      determines a baseline rating for said first item;
      measures an effort value from a user input to said first input mechanism;
      measures an duration value from said user input to said first input mechanism;
      calculates an energy input factor at least in part by multiplying said effort value with said duration value;
      calculates a rating change for said item from energy input, said rating change being made from said baseline rating;
      calculates a new rating based on said rating change and said baseline rating; and
      returns said new rating to said application for said first item;
   said application that further sends said new rating to said database over said network connection.

19. The device of claim 18, said device being embodied in a hand held mobile phone.

20. The device of claim 18, said first input mechanism being a touchscreen.

* * * * *